US00RE36796E

United States Patent [19]

Sato et al.

[11] E Patent Number: Re. 36,796

[45] Reissued Date of Patent: Aug. 1, 2000

[54] METHOD AND APPARATUS FOR DRYING BEARING

[75] Inventors: Chuichi Sato; Akira Kikuchi; Hiroshi Saito; Shinichi Takaira, all of Kanagawa, Japan

[73] Assignee: NSK Ltd., Tokyo, Japan

[21] Appl. No.: 08/698,589

[22] Filed: Aug. 16, 1996

Related U.S. Patent Documents

Reissue of:

[64] Patent No.: 5,337,497
Issued: Aug. 16, 1994
Appl. No.: 07/937,381
Filed: Aug. 31, 1992

[30] Foreign Application Priority Data

Jun. 29, 1992 [JP] Japan ..... 4-171147

[51] Int. Cl.[7] ..... F26B 5/04

[52] U.S. Cl. ..... 34/412; 34/60; 34/92

[58] Field of Search ..... 34/257, 266, 409, 34/412, 417, 60, 79, 90, 92; 134/102.1, 122 R, 199, 200, 10, 12, 21

[56] References Cited

U.S. PATENT DOCUMENTS

| | | | |
|---|---|---|---|
| 3,605,278 | 9/1971 | Ramsay . | |
| 3,698,098 | 10/1972 | Ramsay . | |
| 4,209,914 | 7/1980 | Gustafsson . | |
| 4,530,165 | 7/1985 | Tiedemann . | |
| 5,180,438 | 1/1993 | Hockh et al. . | |
| 5,268,035 | 12/1993 | Neubauer et al. | 134/2 |

FOREIGN PATENT DOCUMENTS

| | | |
|---|---|---|
| 0289982 | 11/1988 | European Pat. Off. . |
| 0454873 | 11/1991 | European Pat. Off. . |
| 0476235 | 3/1992 | European Pat. Off. . |
| 258977 | 10/1926 | United Kingdom . |
| 343981 | 3/1931 | United Kingdom . |
| 572708 | 11/1945 | United Kingdom . |
| 754136 | 8/1956 | United Kingdom . |
| 875614 | 8/1961 | United Kingdom . |
| 1280079 | 7/1972 | United Kingdom . |
| 1436133 | 5/1976 | United Kingdom . |
| 1444900 | 8/1976 | United Kingdom . |
| 2178149 | 2/1987 | United Kingdom . |

*Primary Examiner*—Henry Bennett
*Assistant Examiner*—Steve Gravini
*Attorney, Agent, or Firm*—Sughrue, Mion, Zinn, Macpeak & Seas, PLLC

[57] ABSTRACT

In order to provide a vacuum degreasing-drying method by which extremely small, precision metal products can be degreased and dried quickly and completely without using organic solvents, according to the present invention, an object 112 to be rinsed is put in a vacuum drier 110 after being rinsed with a hydrocarbon cleaning agent and then the air in the vacuum drier 110 is evacuated so as to degrease and dry the object thus rinsed.

25 Claims, 9 Drawing Sheets

SATURATED CURVE

PERFORMANCE CURVE OF VACUUM PUMP

METHOD AND APPARATUS FOR DRYING BEARING

Matter enclosed in heavy brackets [ ] appears in the original patent but forms no part of this reissue specification; matter printed in italics indicates the additions made by reissue.

BACKGROUND OF THE INVENTION

The present invention relates to a method and apparatus for drying bearings, especially those conveyed on a production line after being rinsed with an aqueous solvent such as a water. Further, the present invention also relates generally to a vacuum degreasing-drying methods and more particularly to a vacuum degreasing-drying method for degreasing and drying extremely small, precision metal products, especially extra-small diameter miniature bearings and their parts after they have been rinsed with a hydrocarbon cleaning agent.

A method of the sort that has heretofore been employed for drying metal bearings, especially those complicated in configuration, after being rinsed with an aqueous solvent such as water normally comprises the steps of removing moisture sticking to the surface of the bearing, and drying it by the use of organic solvents such as Freon gas and 1, 1, 1-trichloroethane.

Methods other than what has been mentioned above include drying the bearing rinsed with an aqueous solvent such as water by blowing compressed dry air or hot air thereat; by passing it through warm water; by irradiating it with an infrared ray so as to raise the temperature of its surface; by mechanically wiping off moisture sticking thereto; by placing it in a dehydrator to blow moisture off by means of the centrifugal force; and so forth.

Since such a bearing is coated with grease when it is used, it has to be sufficiently dried until the moisture is completely evaporated, irrespective of the drying method for use.

The use of highly volatile freon gas, 1, 1, 1-trichloroethane and the like as in the prior art ensures that a bearing is dried quickly.

Nonetheless, the growing tendency is for the use of freon gas, 1, 1, 1-trichloroethane and the like to be increasingly restricted worldwise in order to protect the ozone layer. For this reason, it has been called for to refrain from using organic solvents such as freon gas, 1, 1, 1-trichloroethane and the like for drying the bearings rinsed with an aqueous solvent such as water as before. Consequently, the use of the aforementioned organic solvents will certainly be prohibited sooner or later as the necessity of the times is emphasized.

If, however, any one of the aforementioned methods is employed for drying the bearings rinsed with an aqueous solvent such as water without using organic solvents such as freon gas, 1, 1, 1-trichloroethane and the like, and if, for instance, the method of blowing compressed dry air at the bearing is adopted, there will develop a hidden portion, depending on the configuration of the bearing. The water stored in this portion tends to increase the time to dry the bearing, thus decreasing bearing manufacturing productivity, rendering difficult the continuous production of bearings and so on. If, otherwise, the method of blowing hot air at the bearing rinsed with an aqueous solvent such as a water or irradiating it with an infrared ray is used, the resulting heat may badly affect a plastic portion such as a retainer or the bearing itself, or may cause the bearing to gather rust, though the drying period is shortened.

In addition, the method of mechanically wiping off moisture sticking to such a bearing by means of, for instance, a dehydrator still poses a problem in that no effect is actually accomplishable effectively.

Further, as conventional methods for degreasing and drying extremely small, precision metal products and the like complicated in configuration after they have been rinsed with a hydrocarbon cleaning agent, those generally used employ, for instance, chlorine organic solvents such as freon and 1, 1, 1-trichloroethane which are highly volatile at the normal temperature, alcoholic organic solvents such as ethanol, highly volatile petroleum hydrocarbon such as gasoline and petroleum benzine, and chemical compound organic solvents such as benzine, hexane and toluene after a hydrocarbon rinsing process. Such organic solvents are employed for degreasing and drying to ensure that even extremely small, precision metal products can be degreased and dried quickly. Particularly, the use of freon and 1, 1, 1-trichloroethane is effective in degreasing and drying extra-small diameter miniature bearings.

Notwithstanding the above, the use of such freon, 1, 1, 1-trichloroethane and the like has been restricted because they cause great destruction of the ozone layer. Moreover, low inflammable organic solvents need to satisfy complete explosion-proof specifications as they are under rigid restrictions due to the fire laws and the use of them costs a great deal. As a result, a number of problems arise when organic solvents are used because the poisoning preventive regulations are applied to the organic solvents, for instance.

Therefore, efforts may be attempted to degrease and dry extremely small, precision metal products without using the aforementioned organic solvents; however, the problems is that it is still impractical to do so because a great deal of time is consumed for drying and because productivity is considerably reduced. When some of the hydrocarbon cleaning agent is left on the surface of such an extra-small diameter, miniature bearing and its parts as it has been dried incompletely, for instance, the application of grease thereto at the following process step may result in lowering the viscosity of the grease, thus causing grease leakage and the spread of the hydrocarbon cleaning agent. In addition to these problems, the acoustic quality of the bearing may deteriorate or the bearing may fail to come in contact with the shaft of a HDD spindle (hard disk drive spindle) motor or the housing, which may cause dust to gather therein.

SUMMARY OF THE INVENTION

An object of the present invention made to solve the foregoing problems is to provide a method and apparatus for continuously drying bearings quickly without using organic solvents and without causing trouble or rust-gathering because of heat.

In addition, an another object of the present invention made to solve the foregoing problems is to provide a decompression-degrease drying method by which extremely small, precision products are degreased and dried completely and quickly without using the aforementioned organic solvents.

In order to accomplish the object, a method of drying bearings according to the present invention comprises the steps of sealing, in a hermetic container, each of the bearings successively conveyed on a production line after being rinsed with an aqueous solvent such as water, reducing the pressure in the hermetic container, and heat-drying the bearing in the hermetic container.

Further, a drying apparatus according to the present invention comprises a hermetic container for hermetically sealing and holding, in its internal space, each of the bearings successively conveyed on a production line after being rinsed with an aqueous solvent such as water, the space being formed by combining a plurality of divided metal molds, means for reducing the pressure in the internal space of the hermetic container, and means for heating the bearing in the internal space.

In the method and apparatus for drying bearings according to the present invention, each of the bearings successively conveyed on a production line after being rinsed with an aqueous solvent such as water is sealed in the hermetic container and while the pressure in the hermetic container is being reduced, the bearing in the hermetic container is heated, so that even bearings with a complicated configuration may continuously be dried quickly without using organic solvents and without causing trouble or rust-gathering because of the heat.

More specifically, the boiling point of water sticking to the bearing rinsed with an aqueous solvent such as water becomes lower than its boiling point at the atmospheric pressure when the pressure in the hermetic container is reduced and the boiling point actually becomes 50° C. or lower. The aforementioned water tends to become readily evaporated in comparison with its presence at the atmospheric pressure. Moreover, the bearing in the hermetic container is simultaneously heated to set the temperature of the bearing above the water boiling point, whereby the evaporation of the water sticking to the bearing can be accelerated. Therefore, the bearing can be dried quickly. Since the water boiling point is lower than what is at the atmospheric pressure, the water can be evaporated satisfactorily even though the bearing is heated 50° C. or less. The bearing is thus prevented from causing trouble and rust-gathering because of the heat.

Moreover, as the pressure in the hermetic container sharply rises up to the atmospheric pressure when the hermetic container is opened after the aforementioned drying process is completed, the bearing becomes dried sufficiently further.

In order to accomplish the another object, a vacuum degreasing-drying method according to the present invention comprises the steps of rinsing an object with a hdyrocarbon cleaning agent, putting the object thus rinsed in a hermetic container, and evacuating the air in said hermetic container loaded with the rinsed object.

According to the present invention, an object to be rinsed which is complicated in configuration and small in size can be degreased and dried completely and quickly without using any organic solvent by putting the object rinsed with a hydrocarbon cleaning agent in the hermetic container and by evacuating the air in the hermetic container.

More specifically, the vapor pressure of the hydrocarbon cleaning agent increases when the air in the hermetic container is evacuated and the boiling point of the hydrocarbon cleaning agent sticking to the rinsed object becomes lower than its boiling point at atmospheric pressure. Consequently, the hydrocarbon cleaning agent is easier to vaporize than at atmospheric pressure. The rinsed object can thus be degreased and dried completely and quickly as the degreasing and drying process is considerably accelerated.

Moreover, various problems heretofore originating from the use of organic solvents can thoroughly be solved since no organic solvents are used and cost reduction is made possible by the vacuum degreasing-drying method according to the present invention.

Furthermore, it is also possible to improved degreasing-drying efficiency by heating the object in the hermetic container using such an infrared heater, a high-frequency heater or the like.

DETAILED DESCRIPTION OF THE PREFERRED EMBODIMENTS

Referring to the accompanying drawings, an embodiment of the present invention will subsequently be described.

Figure 1:
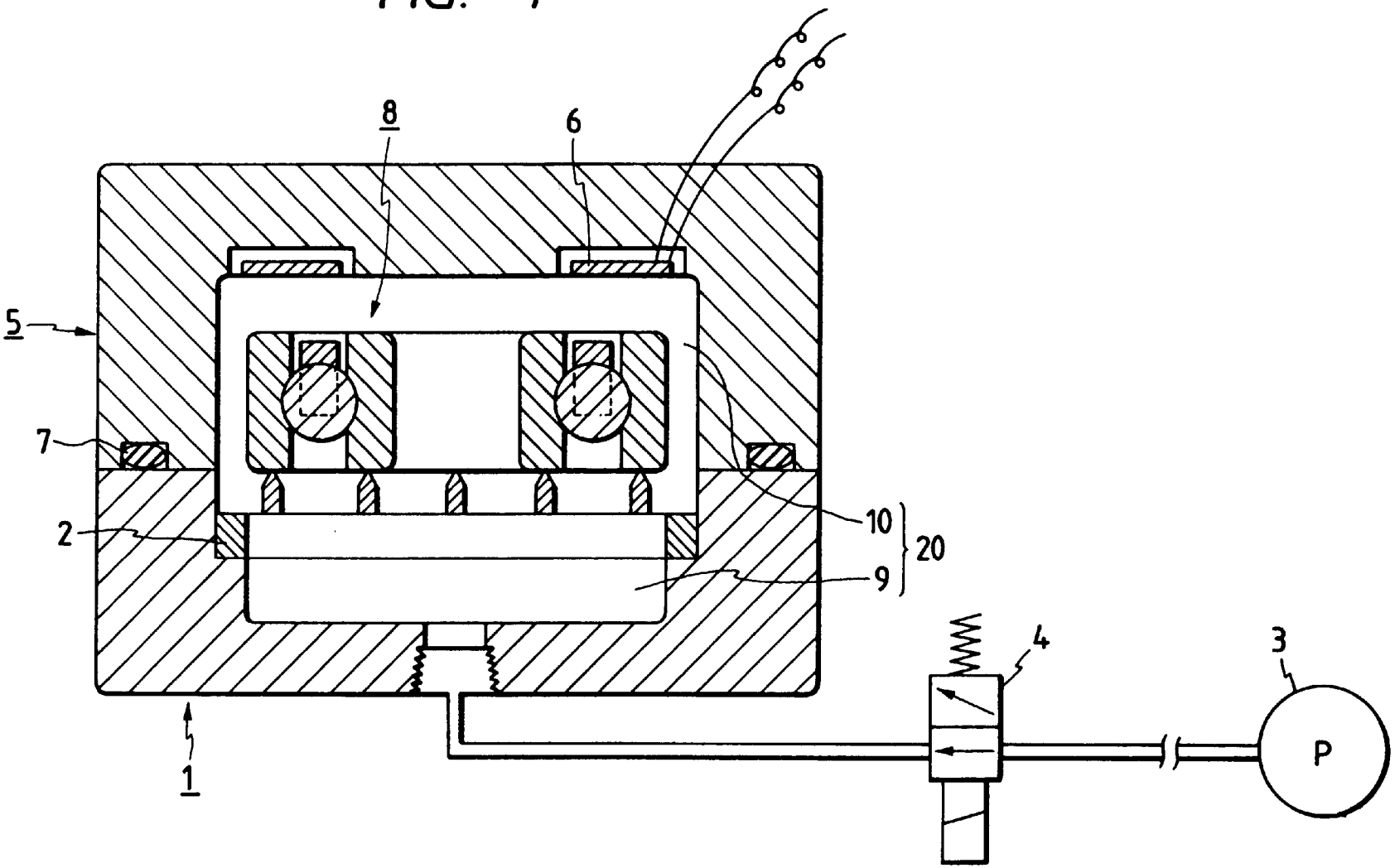
FIG. 1 is a sectional view of a drying apparatus according to a first embodiment of the present invention.

FIG. 1 is a sectional view of a drying apparatus embodying the present invention.

As shown in FIG. 1, a hermetic container in the drying apparatus according to the present invention comprises a lower mold 1 and an upper mold 5, an internal space 9 of the lower mold and internal space 10 of the upper mold constituting an internal space 20 of the hermetic container.

The lower mold 1 has the internal space 9 and a circular work guide 2 is supported by and fixed onto the stepped portion on the inner periphery of the space 9 therein, the circular work guide having a slide guide face capable of loading/unloading workpieces (bearings) when those successively conveyed on a production line are put in the hermetic container. The internal spaces 9, 10 of the lower and upper molds communicate with each other via the work guide 2, which is slatted so that air can circulate through the internal spaces 9, 10 of the lower and upper molds. Moreover, a vacuum pump 3 is connected via a solenoid valve 4 to the internal space 9 of the lower mold in order to pump out the air from the internal space 20 of the hermetic container.

On the other hand, the upper mold 5 has the internal space 10 formed in such a way that the workpiece 8 can be hermetically sealed therein and a high-frequency heater 6 for heating the workpiece 8 is installed on the periphery of the ceiling of the internal space 10 of the upper mold. Further, the upper mold 5 is provided with an O-ring 7 having a sealing effect in insulating the internal space 20 of the hermetic container from the outside when the lower mold 1 is combined with the upper mold 5.

The workpiece for use in the embodiment shown is so constructed that, as shown in FIG. 1, balls are held by a plastic retainer between an outer and an inner ring. In the conventional drying method, there develops a shaded portion at the contact area between the ball and the retainer is complicated in configuration and this results in requiring a longer time for drying.

Referring to sectional views of a workpiece to be dried, the operation of the drying apparatus according to the present invention will subsequently be described.

Sectional views of FIG. 2 refer to the steps of rinsing the workpiece with an aqueous solvent such as water and drying it by means of the drying apparatus shown in FIG. 1.

Figure 2A:
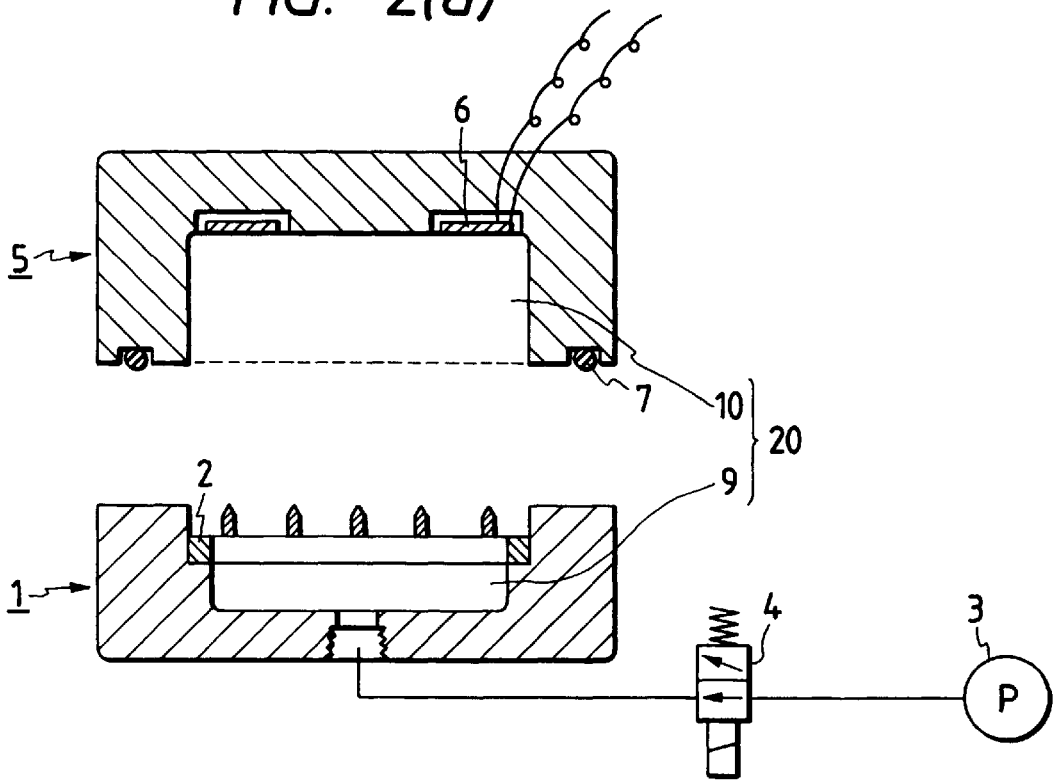
FIGS. 2(a)–2(d) are sectional views of a workpiece to be dried through the process illustrated according to the present invention, respectively.

At the step of FIG. 2(a), the lower mold 1 and the upper mold 5 are in a vertically separated condition in which the loading of each of the workpieces 8 successively conveyed on a production line is waited for. At this time, the solenoid valve 4 is in the OFF state (in which the piping extended from the vacuum pump 3 remains cut-off) and the power supply of the high-frequency heater 6 is also in the OFF state.

At the step of FIG. 2(b), the workpiece 8 conveyed on the line is subsequently caused to slide on the surface of the work guide 2 and loaded in position.

Figure 2B:
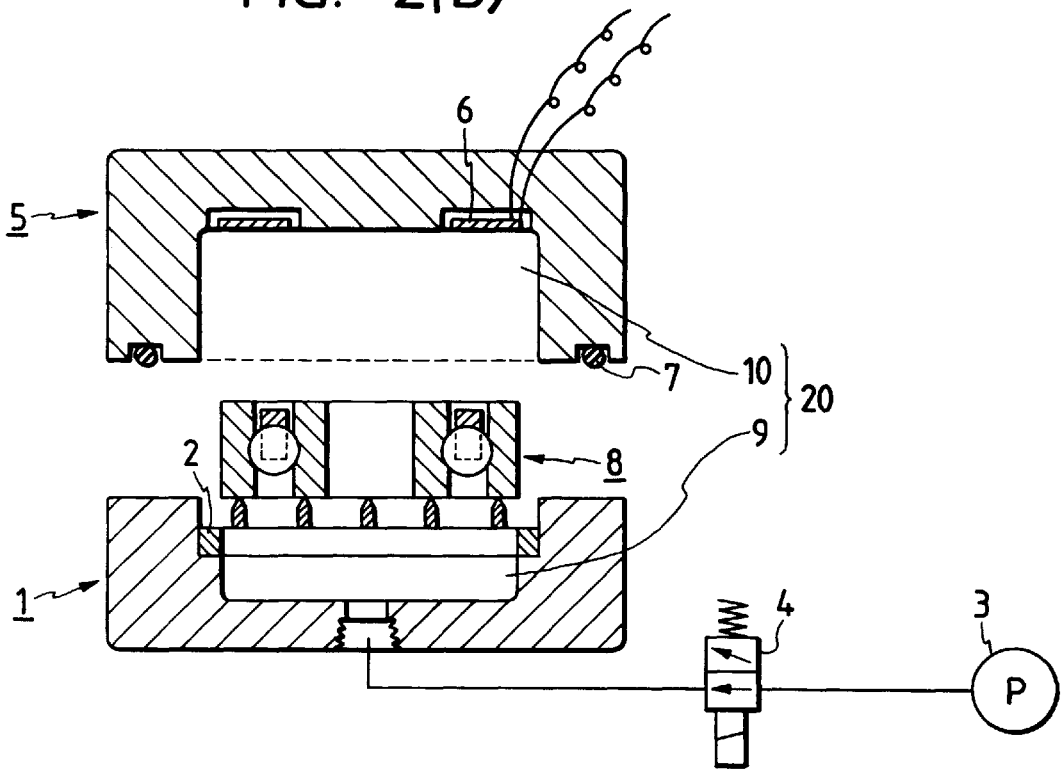
Figure 2C:
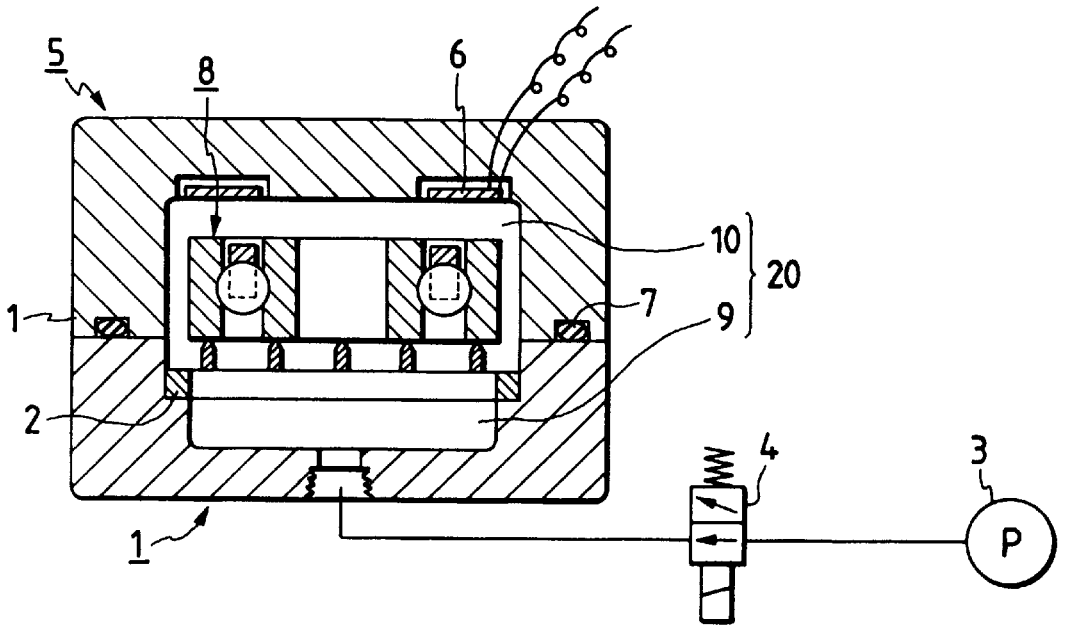

At the step of FIG. 2(c), the upper mold 5 is mounted on the lower mold 1 and these molds are tightly coupled together by means of an actuator such as a cylinder (not shown). At this time, the internal space 20 of the hermetic container is insulated by the O-ring 7 having the sealing effect from the outside. Then the solenoid valve 4 is turned on (i.e., the piping extended from the vacuum pump 3 is opened) to reduce the pressure in the internal space 20 of the hermetic container to 0.1~0.3 atmosphere. Subsequently, the power supply of the high-frequency heater 6 is turned on to raise the temperature of the workpiece 8 to 50°~80° C. for drying purposes. High-frequency heating at this time makes it possible to heat and dry the workpiece 8 uniformly.

Figure 2D:
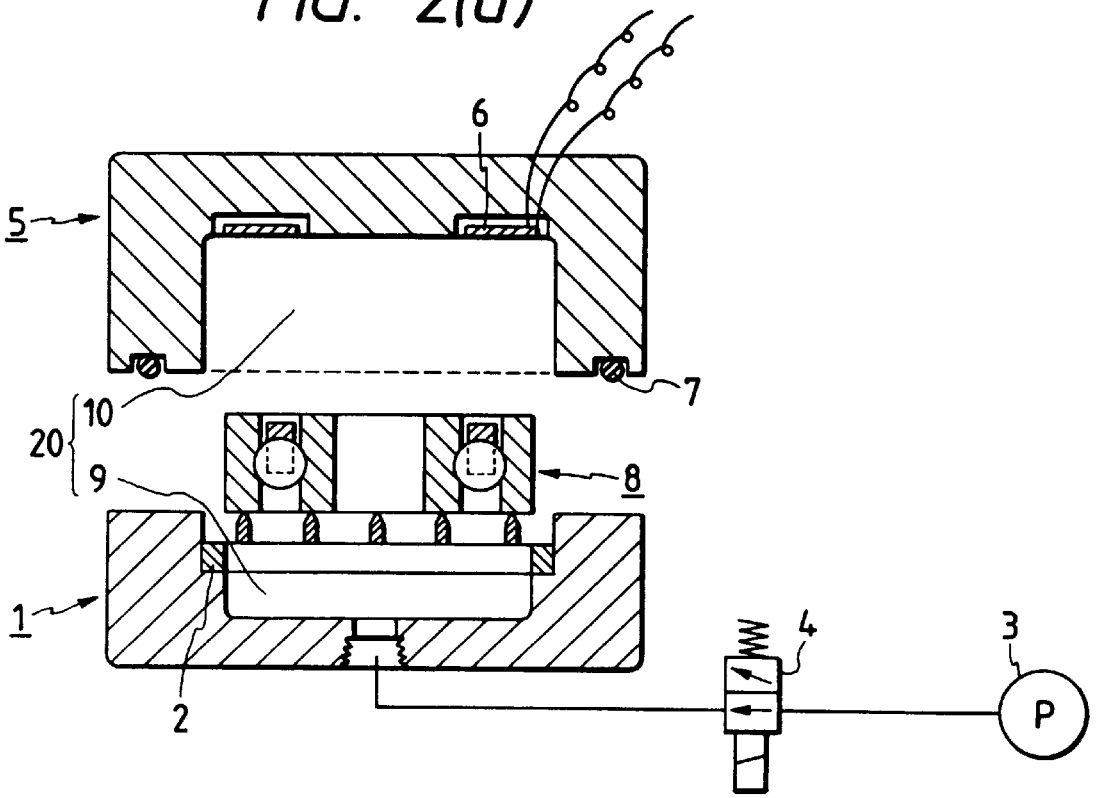

At the step of FIG. 2(d), the power supply of the high-frequency heater 6 is turned off and the solenoid valve 4 is also turned off so as to separate the lower mold 1 from the upper mold 5. As the pressure in the internal space 20 of the hermetic container then sharply rises up to the atmospheric pressure, the workpiece 8 is sufficiently dried further. Subsequently, the workpiece 8 is unloaded and discharged from the work guide 2. The state of FIG. 2(a) is then restored.

The next workpiece conveyed on the line is also passed through the same process and those successively conveyed thereon can be dried consecutively.

A description will subsequently be given of another embodiment of the present invention.

Figure 3:
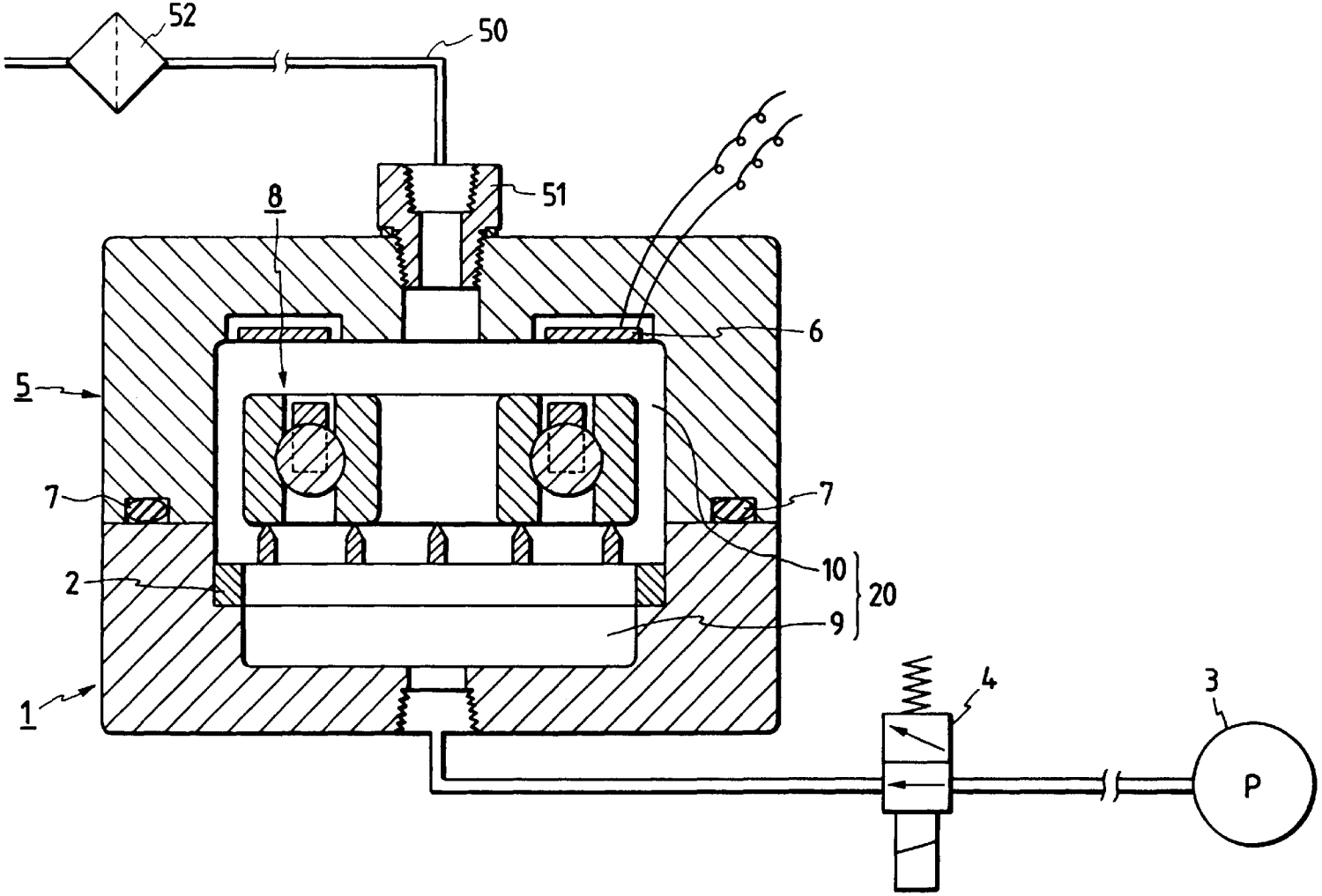
FIG. 3 is a sectional view of a drying apparatus according to a second embodiment of the present invention.

FIG. 3 is a sectional view of a drying apparatus of the second embodiment of the present invention, wherein the apparatus similar to what is shown in FIG. 1 is equipped with a choke device and a filter.

In the drying apparatus of FIG. 3, the upper mold 5 of what is shown in FIG. 1 is supplied with a choke device 51 communicating with the internal space 10 thereof and the choke device 51 is connected via piping 50 to a filter 52, whereby air can circulate through the internal space 20 of the hermetic container.

Until the lower mode 1 is separated from the upper mold 5 on the termination of reducing the pressure in the internal space 20 of the hermetic container at the step of FIG. 2(d) after the reduction of the pressure therein is started at the step of FIG. 2(c), the choke device 51 operates to regulate the flow rate of clean air passing through the filter 52 and the air is introduced into the internal space 20 of the hermetic container. Saturated vapor existing in the internal space 20 of the hermetic container is thus expelled to prevent rust from gathering on the workpiece with the effect of brushing it with clean air.

Figure 4:
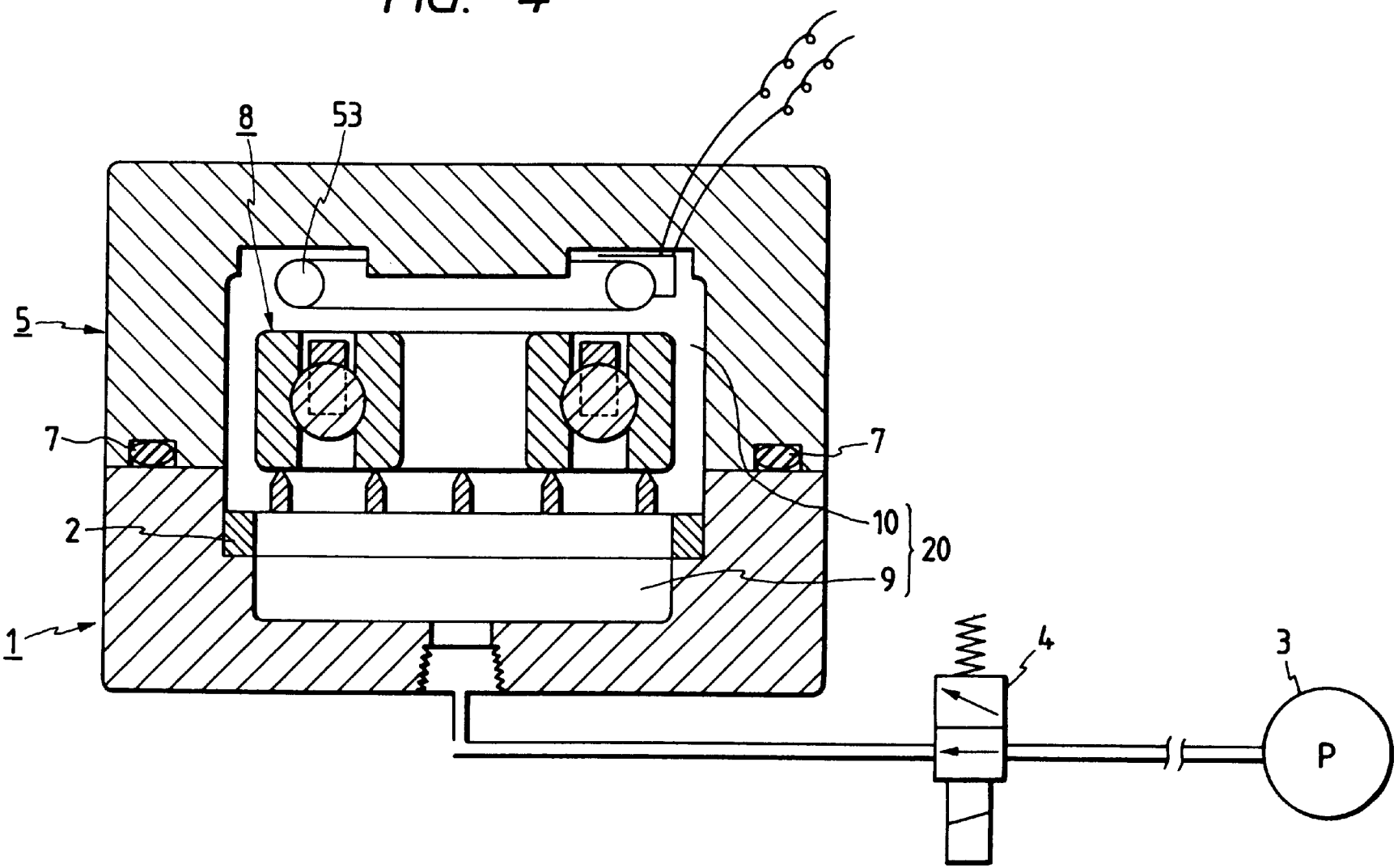
FIG. 4 is a sectional view of a drying apparatus according to a third embodiment of the present invention.

FIG. 4 is a sectional view of a drying apparatus of the third embodiment of the present invention, wherein instead of the high-frequency heater 6 of the drying apparatus of FIG. 1, an infrared heater 53 is employed.

The use of such an infrared heater 53 makes radiation heating possible.

Figure 5:
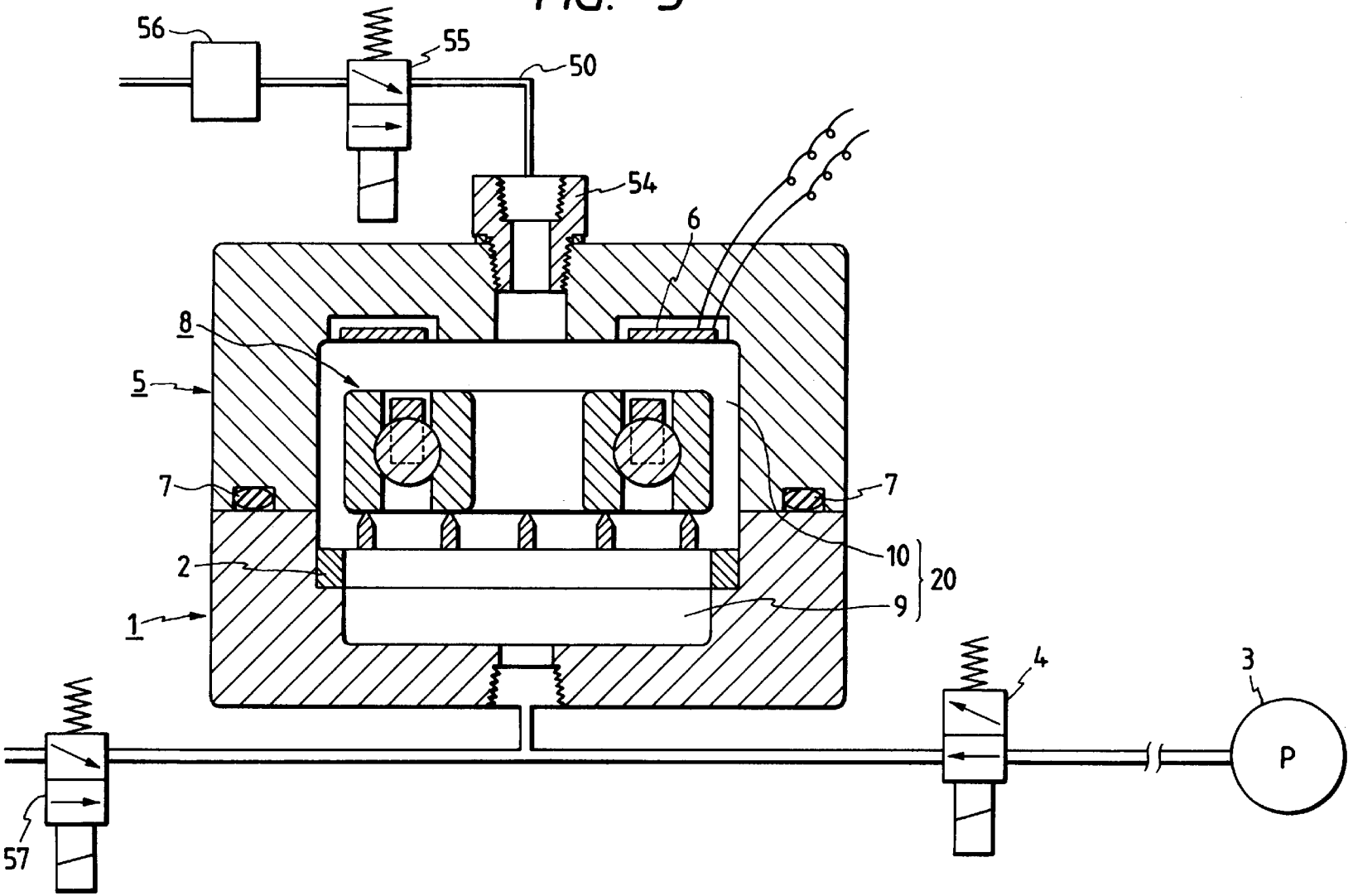
FIG. 5 is a sectional view of a drying apparatus according to a fourth embodiment of the present invention.

FIG. 5 is a sectional view of a drying apparatus of the fourth embodiment of the present invention, wherein a piping part, a solenoid valve and an oil mist lubricator are provided for the upper mold of the apparatus similar to what is shown in FIG. 1 and wherein an additional solenoid valve is also provided for the lower mold thereof.

The upper mold 5 of the drying apparatus of FIG. 5 similar to what is shown in FIG. 1 is equipped with a piping part 54 in such a way as to communicate with the internal space 10 of the upper mold and a solenoid valve 55 is connected via piping 50 to the piping part 54. Further, the solenoid valve 55 is consecutively connected to an oil mist lubricator 56 loaded with rust preventive oil. The rust preventive oil is introduced into the internal space 20 of the hermetic container and made to stick to the workpiece 8 therein. An additional solenoid valve 57 is connected to the lower mold 1, thus allowing air to circulate from the outside to the internal space 20 of the hermetic container.

With respect to the operation of the solenoid valve 55, the oil mist lubricator 56 and the solenoid valve 57, the solenoid valves 55, 57 are held OFF until the steps of FIGS. 2(a) to 2(c) are taken. The solenoid valve 4 is turned off after the step of FIG. 2(c) has been taken and then the solenoid valves 55, 57 are turned on to introduce the rust preventive oil from the oil mist lubricator 56 via the piping part 54 into the internal space 20 of the hermetic container. Part of the rust preventive oil thus introduced sticks to the workpiece 8 and the remainder is discharged from the hermetic container via the solenoid valve 57. The workpiece 8 is thus rendered rust proof through the process mentioned above.

Figure 6:
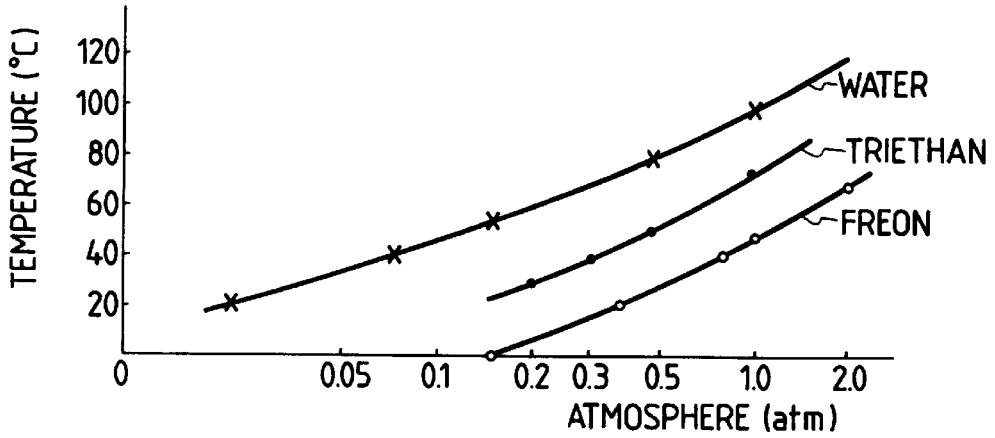
FIG. 6 is a water saturation curve.
Figure 7:
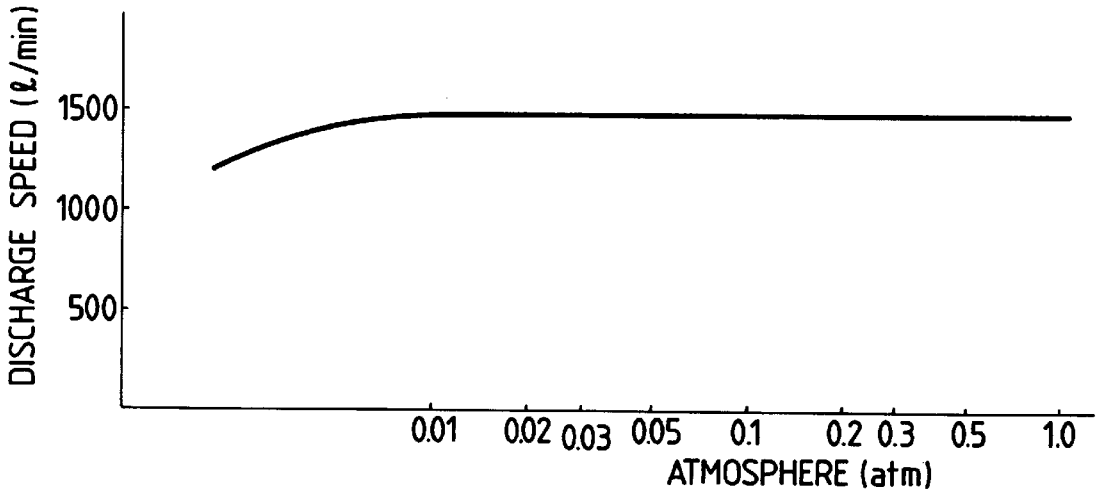
FIG. 7 is a vacuum pump performance curve.

Since the bearing having a plastic portion has been used as a workpiece in this embodiment, the pressure in the internal space of the hermetic container has been set at 0.1~0.3 atmosphere and the workpiece has been heated up to 50°~80° C. in consideration of the allowable plastic heating temperature (about 90° C.) at the step of FIG. 2(c). However, the set conditions are not limited to those enumerated above but the pressure therein as well as the working heating temperature may be set in harmony with allowable heating temperatures, depending on the material quality of the workpiece. At this time, the relation between the pressure and the work heating temperature may preferably be determined by saturation curves of FIG. 6. Further, FIG. 7 shows a performance curve of the vacuum pump used in this embodiment. As shown in FIG. 7, the discharge speed can be held constant (1,500 l/min) even though the pressure in the internal space of the hermetic container is reduced to 0.1~0.3 atmosphere. Consequently, this hermetic container is seen to offer a stable pressure reduction performance. Furthermore, the workpiece can be dried more efficiently by determining the pressure in the internal space of the hermetic container and the temperature at which the workpiece is heated in dependence of the performance (capability) of a vacuum pump for use. It is also possible to promote water evaporation by decreasing the pressure in the internal space of the hermetic container as much as possible within the range of the performance of the vacuum pump. Moreover, the drying period can be made shorter by raising the temperature as much as possible at which the workpiece is heated within the allowable heating range.

Although the workpiece has been heated after the pressure in the internal space of the hermetic container is decreased to prevent the workpiece from gathering rust at the step of FIG. 2(c), the reduction in pressure may be made simultaneously with heating when a workpiece is made of rust proof material. The drying cycle time is also reducible by making the pressure reduction and the heating simultaneously.

The internal space of the hermetic container should preferably be formed as narrow as possible within the range allowed to seal the workpiece. The narrower the internal space of the hermetic container, the greater the pressure reduction effect improves, whereby the workpiece can be dried efficiently in a short time.

Although the high-frequency heater has been installed in the internal space of the upper mold in the drying apparatus shown in FIG. 1, it may otherwise be positioned anywhere on condition that the workpiece can be heated. Moreover, the vacuum pump and the solenoid may also be positioned anywhere on condition that the pressure in the internal space of the hermetic container is reducible.

Although the choke device 51 and the filter 52 have been so arranged as to communicate with the internal space 10 of the upper mold in the drying apparatus shown in FIG. 3, they may otherwise be positioned anywhere on condition that clean air passing through the filter 52 can be introduced into the internal space of the hermetic container.

Although the piping part 54, the solenoid valve 55 and the oil mist lubricator 56 have been so arranged as to communicate with the internal space of the upper mold while the solenoid valve 57 to communicate with the internal space of the lower mold in the drying apparatus shown in FIG. 5, they may otherwise be positioned anywhere on condition that rust preventive oil can be introduced into the internal space of the hermetic container and discharged from the drying apparatus.

Moreover, though a description has been given of the drying apparatus which is divided into the upper and lower molds, it may otherwise be divided bisymmetrically, diagonally or into more than two parts.

Further, the means of heating the workpiece may optionally be selected from among a high-frequency heater, an infrared heater, a Nichrome wire, a ceramic heater and the like.

Although one workpiece has been dried each time in the embodiment shown, a plurality of workpieces, if desired, may be dried at a time.

As set forth above, the method and apparatus according to the present invention are used for drying bearings by sealing, in the hermetic container, each of the bearings successively conveyed on a production line after being rinsed with an aqueous solvent such as water, reducing the pressure in the hermetic container, and heat-drying the bearing in the hermetic container. In this way, even bearings complicated in configuration can successively be dried in a short time without using organic solvents, without bringing trouble to the bearing because of heat and causing the bearing to gather rust.

Further, referring to the accompanying drawings, a fifth embodiment of the present invention will subsequently be described.

Figure 8:
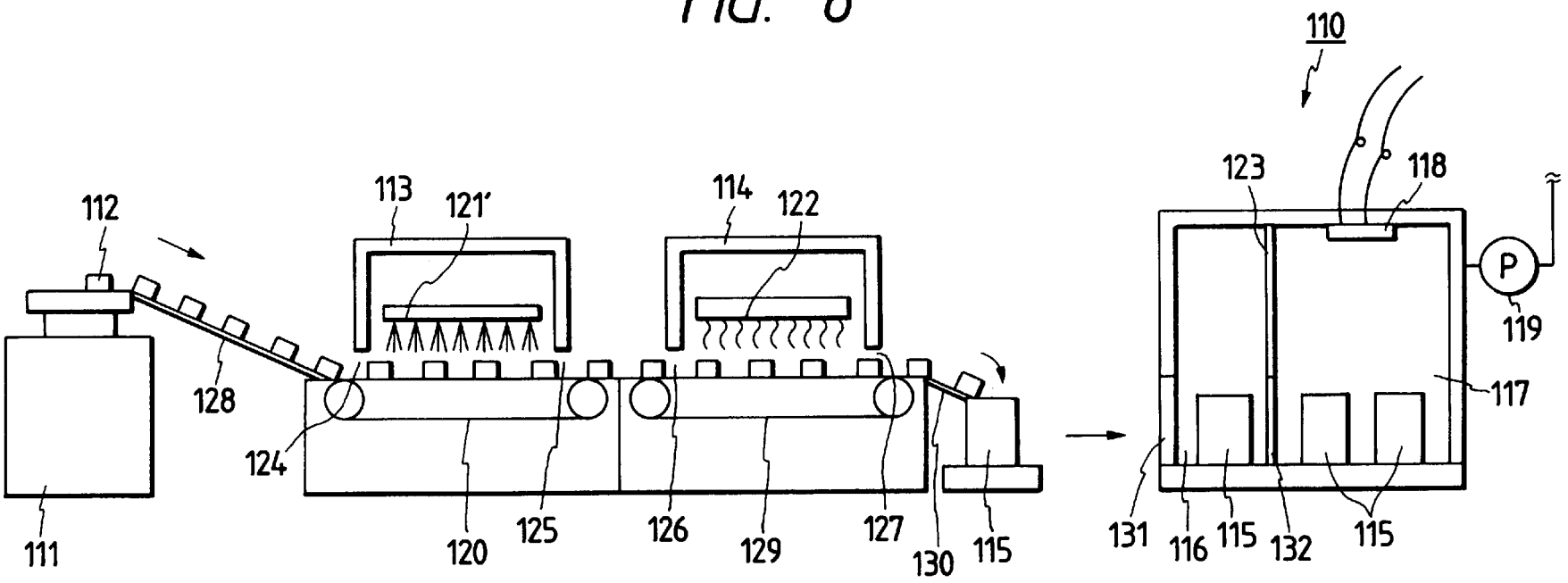
FIG. 8 is a block diagram illustrating vacuum degreasing-drying process steps of the fifth embodiment of the present invention.

FIG. 8 is a block diagram illustrating a vacuum degreasing-drying process according to a fifth embodiment of the present invention.

In the vacuum degreasing-drying process shown in FIG. 8, use may be made of a parts feeder 111 for feeding objects 112 to be rinsed, a rinsing mechanism 113 using a hydrocarbon for rinsing the object 112 fed from the parts feeder 111, a degreasing machine 114 for degreasing the object 112 by air after the hydrocarbon-rinsing operation has been done, a product can 115 for accommodating the objects thus degreased by air, the product can being provided with a net cage or a flinger shelf for flatly putting the objects 112 side by side, and a vacuum drier 110 for vacuum-drying the objects 112 thus accommodated in the product can 115.

The parts feeder 111 and the rinsing machine 113 are continuously coupled together via a belt conveyor 128 and the object 112 to be rinsed is conveyed by the belt conveyor 128 from the parts feeder 111 to the rinsing machine 113.

The rinsing machine 113 has an open entrance 124, an open exit 125 and nozzles 121 for sending out a jet of cleaning agent to the object 112, the nozzles being located above and between the entrance 124 and the exit 125. Further, a rinsing conveyor 120 for conveying the objects 112 is installed opposite to and under the nozzles 121 in such a way as to pass through the entrance 124 and the exit 125 of the rinsing machine 113. While being conveyed by the conveyor 120 from the entrance 124 to the exit 125 through the rinsing machine 113, the object 112 is rinsed with the cleaning agent jetted from the nozzles 121.

The degreasing machine 114 has an open entrance 126, an open exit 127 and air nozzles 122 for sending out air to the object 112, the air nozzles being located above and between the entrance 126 and the exit 127. Further, a degreasing conveyor 129 for conveying the objects 112 is installed opposite to and under the air nozzles 122 in such a way as to pass through the entrance 126 and the exit 127 of the degreasing machine 114. While being conveyed by the conveyor 129 from the entrance 126 to the exit 127 through the degreasing machine 114, the object is degreased by the air jetted from the nozzles 122.

An orientation means 130 arranges flatly the objects 112 discharged from the degreasing machine 114 in the product can 115.

The vacuum drier 110 comprises a spare chamber 116 and a vacuum chamber 117 with a partition 123 for separating the former from the latter, and a drier entrance 131 that can be opened and shut is provided on the spare chamber side 116. When the entrance 131 of the drier is shut, the spare chamber 116 can be held in a hermetic condition and the partition 123 is shut for evacuating the air or for hot air drying, so that the remaining cleaning agent sticking to the object 112 being rinsed is preliminarily dried. The object 112 being rinsed is preliminarily dried to ensure that full drying time in the vacuum chamber 117 can be shortened. An open/close gateway 132 for the object is installed, whereby the object 112 to be dried can be reciprocated between the spare chamber 116 and the vacuum chamber 117. When the gate way 132 is closed, the vacuum chamber 117 can be held in a hermetic condition. A vacuum pump 119 for evacuating the air in the vacuum chamber 117 is coupled to the vacuum chamber 117 and further an infrared heater 118 for heating the object 112 is also installed.

The product can 115 and the vacuum drier 110 may be connected via a belt conveyer (not shown), for instance, by which the product can 115 accommodating the objects 112 to be rinsed can be conveyed up to the vacuum drier 110.

Otherwise, the vacuum drier 110 may be installed independently and conveyed up to the vacuum drier 110 by a conveying means such as a dolly.

In this embodiment, the vacuum drier 110 is provided with the infrared heater 118 for heating the object 112. However, not only the infrared heater but also any other heating means such as a high-frequency heater, a ceramic heater and an electric heater may be installed. Moreover, the installation of the heating means is not necessarily essential.

Although the vacuum drier 110 has been divided into the spare chamber 116 and the vacuum chamber 117 in this embodiment, it is unnecessary to do so as long as the vacuum drier 110 can be hermetically sealed to create a vacuum and the vacuum drier may be formed into one room.

Moreover, the parts feeder 111, the rinsing machine 113 and the air degreasing machine 114 have been described only by way of example in this embodiment. However, any other known apparatus of that sort may be employed or what has other additional functions may needless to say be installed when desired.

Referring to FIG. 8, the vacuum drier 110 has been described in this embodiment. However, the object of the present invention can thoroughly be accomplished by a vacuum drying method and apparatus having a drying means as shown in the first-fourth embodiments of the present invention. More specifically, the method therefor comprises the steps of forming a hermetic container by combining a plurality of divided molds together and conveying bearings successively into the hermetic container, evacuating the air in the hermetic container, and heat-drying the heating. With this method and apparatus, the object of the present invention is also accomplishable.

A description will subsequently be given of the vacuum degreasing-drying method according to the present invention.

First, the object 112 supplied from the parts feeder 111 is conveyed by the belt conveyer 128 up to the rinsing machine 113, put by the rinsing conveyer 120 in the rinsing machine 113 through its entrance 124, and made to proceed in the rinsing machine 113 toward the exit 125. During this time, the object is rinsed with jets of the hydrocarbon cleaning agent from the nozzles 121. Incidentally, illuminating kerosine was used as the hydrocarbon cleaning agent in this embodiment.

The object 112 discharged from the exit 125 of the rinsing machine is subsequently conveyed from the rinsing conveyer 120 to the degreasing conveyer 129 before being conveyed to the degreasing machine 114. The object 112 thus conveyed to the degreasing machine 114 put by the degreasing conveyer 129 in the degreasing machine 114 through the entrance 126 and caused to proceed in the degreasing machine 114 toward the exit 127. During this time, the object 112 is degreased by the air blow jetted from the air nozzles 122. Although the method of degreasing the cleaning agent sticking to the object 112 by the air blow has been described in this embodiment, the object 112 may be put in a container capable of flingering (e.g., a net cage or the like) and subjected to centrifugal degreasing (e.g., 3,200 r.p.m.). The object 112 thus degreased may be conveyed to the space chamber 116 of the vacuum drier 110 for the purpose of preliminary drying by using the container as the product can 115.

Thus object 112 discharged from the degreasing machine 114 is conveyed from the degreasing conveyer 129 to the orientation means 130 by which it is accommodated in the product can 115.

The product can 115 accommodating the objects 112 is conveyed to the vacuum drier 110 and put in the spare chamber 116 through the entrance 131 of the drying machine. Subsequently, the entrance 131 is closed so as to carry out preliminary drying in the hermetic spare chamber 116. The preliminary drying may, as set forth above, be carried out while another object 112 is being subjected to thorough vacuum drying in the vacuum chamber 117 by shutting the partition 123. Then the gateway 132 for the object is opened and the product can 115 in the spare chamber 116 is transferred to the vacuum chamber 117 and then the gateway 132 therefor is closed. Subsequently, the vacuum pump 119 is first operated so as to create a vacuum in the vacuum chamber 117 and the object 112 being rinsed is heated by the infrared heater 118 up to about 80° C. At this time, the pressure in the vacuum chamber 117 was reduced up to $760\times10^{-3}\sim760\times10^{-4}$ Torr ($10^{-3}\sim10^{-4}$ atmosphere).

The object 112 thus rinsed was completely dried quickly in this way.

Although illuminating kerosine was used as the hydrocarbon cleaning agent in this embodiment, not only illuminating kerosine but also a cleaning agent such as 'Actrel' 1178L, 1140L, 1111L of Exson chemical having physical and chemical properties equivalent to those of illuminating kerosine obtained by distilling petroleum, or petroleum or hydrocarbon light oil may be selected as occasion demands.

The pressure in the vacuum chamber 117 has been reduced up to $760\times10^{-3}\sim760\times10^{-4}$ Torr in this embodiment. However, not only this decompressed condition but also $10^{-1}$ Torr or an atmospheric pressure of 0.1~0.3 may properly be selected, depending on the object 112 being rinsed or the cleaning agent.

Further, the relation between the atmospheric pressure and the vapor amount at the time the hydrocarbon cleaning agent is dried (vaporized) was examined in the following method.

Figure 9:
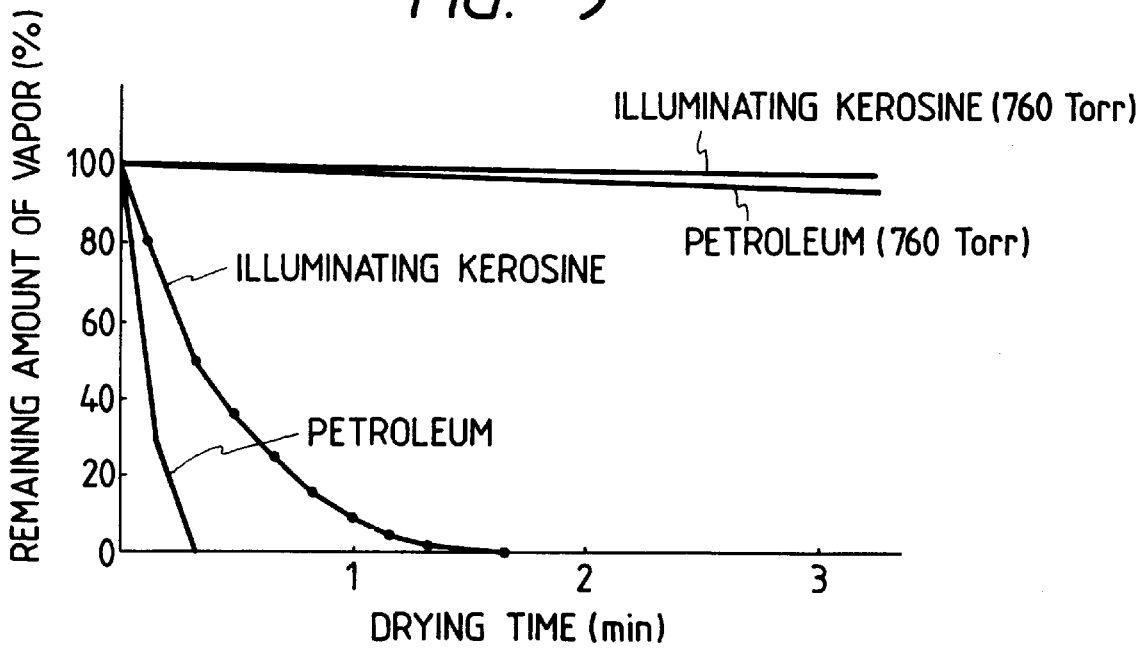
FIG. 9 is a graph showing the relation between the atmospheric pressure and the vapor amount at the time hydrocarbon cleaning agents are dried according to the present invention.

The aforementioned rinsing machine 113 was used to rinse miniature bearings (#695) as finished objects to be rinsed, which were degreased by means of the degreasing machine 114. At this point of time, 5 mg of hydrocarbon cleaning agent was seen to stick to each bearing thus air-degreased. Subsequently, the dry conditions of the bearings were observed in both cases where the vacuum chamber was set at $10^{-1}$ Torr, 25° C. and at the atmospheric, 25° C., using the vacuum drier 110. With respect to hydrocarbon cleaning agents, commercial products (petroleum hydrocarbon of C8~C12) obtained by distilling illuminating kerosine and kerosine) where used. FIG. 9 shows the test results.

As shown in FIG. 9, it was confirmed that drying time was conspicuously shortened when the air in the vacuum chamber 17 was evacuated ($10^{-1}$ Torr, 25° C.) as compared with a case where it was not evacuated (atmospheric pressure).

Subsequently, the relation between the atmospheric temperature and the vapor amount at the time the hydrocarbon cleaning agent was dried (vaporized) was examined in the following method.

Figure 10:
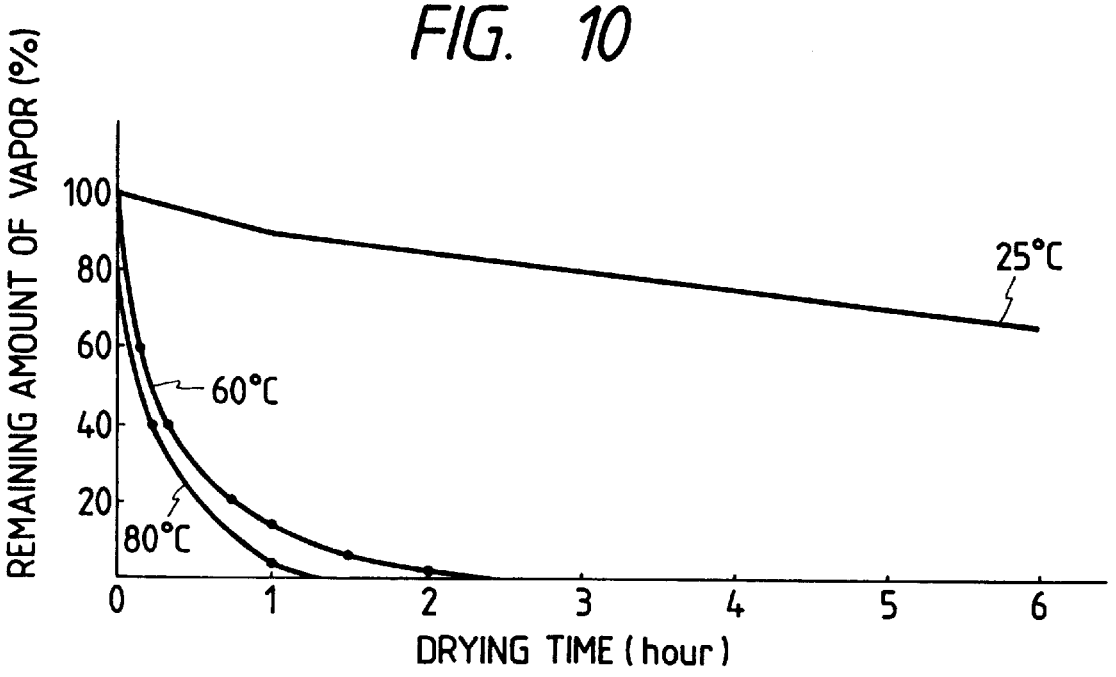
FIG. 10 is a graph showing the relation between the atmospheric temperature and the vapor amount at the time hydrocarbon cleaning agents are dried according to the present invention.

As samples of hydrocarbon cleaning agents, 20 ml of illuminating kerosine was put on three laboratory dishes and these samples were placed in constant temperature baths respectively at 25° C., 60° C. and 80° C. (at the atmospheric pressure) and the remaining amount of the illuminating kerosine thus evaporated was observed. FIG. 10 shows the test results.

As shown in FIG. 10, it was confirmed that the sample in the constant temperature bath at 80° C. was completely vaporized for about 90 minutes; the sample in the constant temperature bath at 60° C. was completely vaporized for about 135 minutes; however, over 60% of the sample in the constant temperature bath at 25° C. was seen to remain after a time lapse of more than 6 hours. As is obvious from the test results, the evaporation of the hydrocarbon cleaning agent was undoubtedly accelerated when the atmospheric temperature and the degree of vacuum were increased.

As set forth above, the evaporation of the hydrocarbon cleaning agent sticking to the object to be rinsed can be accelerated by evacuating the air in the hermetic container in which the object rinsed with the hydrocarbon cleaning agent is put in the vacuum degreasing-drying method according to the present invention. Therefore, the object to be rinsed which is not only complicated in configuration but also small in size can be degreased and dried quickly and completely without using organic solvents. As a result, various problems heretofore originating from the use of organic solvents can thoroughly be solved and cost reduction is also made possible.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for drying objects comprising the steps of:

sealing, in a hermetic container, each of the objects successively conveyed on a production line after being rinsed with *one of* an aqueous solvent *and a hydrocarbon type solvent*;

reducing the pressure in said hermetic container in such a manner that the boiling point of *the one of* the aqueous solvent *and a hydrocarbon type solvent* after reducing the pressure becomes lower than the boiling point of *the one of* the aqueous solvent *and a hydrocarbon type solvent* at the atmospheric pressure; and heat-drying said objects in said hermetic container after said reducing step.

2. A method for drying objects according to claim 1, further comprising:

introducing a clean air into said hermetic container after said pressure reducing step.

3. A method for drying objects according to claim 1, further comprising:

introducing a rust preventive oil into said hermetic container so as to stick part of the rust preventive oil to each of the objects.

4. A method for drying objects according to claim 1, in which the pressure in the internal space of the hermetic container is reduced at 0.1~0.3 atmosphere.

5. A method for drying objects according to claim 1, in which the objects is heated up to [50°~] 80° C. in the heat-drying step.

6. A method for drying objects according to claim 1 wherein said heat-drying step conducted in such a manner that the boiling point of the *one of the* aqueous solvent *and the hydrocarbon type solvent* is lower than the boiling point of the *one of the* aqueous solvent *and the hydrocarbon type solvent* at atmospheric pressure.

7. A drying apparatus comprising:

a hermetic container for hermetically sealing and holding, in its internal space, objects after the objects have been rinsed with one of an aqueous solvent and a hydrocarbon type solvent, said space being formed by combining a plurality of divided metal molds;

pressure reducing means for reducing the pressure in the internal space of said hermetic container in such a manner that the boiling point of the one of the aqueous solvent and the hydrocarbon solvent after reducing the pressure becomes lower than the boiling point of the one of the aqueous solvent and the hydrocarbon solvent at atmospheric pressure; and heating means for heating the objects in said internal space subsequent to a pressure reduction process accomplished by said pressure reducing means.

8. A drying apparatus according to claim 7, in which said heating means is selected from the group essentially consisting of a high-frequency heater, an infrared heater, a Nichrome wire, and a ceramic heater.

9. A drying apparatus according to claim 7, further comprising:

air introducing means for introducing a clean air into the internal space of said hermetic container.

10. A drying apparatus according to claim 9, in which said air introducing means comprises:

a filter for cleaning up an air in such a manner that said clean air is produced; and a choke device for communicating with the internal space of said hermetic container and for regulating the flow rate of said clean air introducing to the internal space of said hermetic container.

11. A drying apparatus according to claim 7, further comprises:

oil introducing means for introducing a rust preventive oil into the internal space of said hermetic container so as to stick part of the rust preventive oil to each of the bearings.

12. A drying apparatus according to claim 11, in which said oil introducing means is an oil mist lubricator.

13. A drying apparatus according to claim 7, in which the pressure reducing means reduces the pressure in the internal space of the hermetic container at $10^{-1}$~$10^{-4}$ atmosphere.

14. A drying apparatus according to claim 7, in which said heating means heats the bearings up to 80° C. in the internal space of said hermetic container.

15. A drying apparatus according to claim 7 wherein said heating means heats the objects in such a manner that the boiling point of the one of the aqueous solvent and hydrocarbon cleaning agent is lower than the boiling point of the one of the aqueous solvent and hydrocarbon cleaning agent at atmospheric pressure.

16. A vacuum degreasing-drying method comprising the steps of:

rinsing an object with [a hydrocarbon cleaning agent] *one of an aqueous solvent and a hydrocarbon type solvent*;

putting the object thus rinsed in a hermetic container; [and]

evacuating the air in said hermetic container loaded with said rinsed object in such a manner that the boiling point of [said hydrocarbon cleaning agent] *the one of the aqueous solvent and the hydrocarbon type solvent* after evacuating the air becomes lower than the boiling point of [the hydrocarbon cleaning agent] *the one of the aqueous solvent and the hydrocarbon type solvent* at atmospheric pressure*; and*

*heating said object in said hermetic container after said evacuating step.*

17. A vacuum degreasing-drying method according to claim 16, further comprising the steps of:

degreasing the [cleaning agent] *the one of the aqueous solvent and the hydrocarbon type solvent* sticking to said object, said degreasing step being conducted after said rinsing step but before said putting step.

18. A vacuum degreasing-drying method according to claim 17, in which said degreasing step is operated in such a manner that said object is degreased by one of an air blow jetted from a degreasing machine and a centrifugal degreasing.

[19. A vacuum degreasing-drying method according to claim 16, further comprising the steps of:

heating said object in said hermetic container after said evacuating step.]

20. A vacuum degreasing-drying method according to claim [19] *16*, in which said object is heated up to about 80° C. in the heating step.

21. A vacuum degreasing-drying method according to claim 16 wherein said heating step is conducted in such a manner that the boiling point *of* the *one of the* aqueous solvent *and the hydrocarbon type solvent* is lower than the boiling point of the *one of the* aqueous solvent [or] *and the* hydrocarbon [cleaning agent] *type solvent* at atmospheric pressure.

22. A vacuum degreasing-drying method according to claim 16, in which said rinsing step is operated in such a manner that said object is rinsed with jets of [said hydrocarbon cleaning agent] *the one of the aqueous solvent or hydrocarbon type solvent* with a rinsing machine.

23. A vacuum degreasing-drying method according to claim 16, in which the pressure in an internal space of the hermetic container is reduced up to $10^{-1}$~$10^{-4}$ atmosphere in said air evacuating step.

24. A method for drying bearings comprising the steps of:

sealing, in a hermetic container, each of the bearings successively conveyed on a production line after being rinsed with *one of* an aqueous solvent *and a hydrocarbon solvent*;

reducing the pressure in said hermetic container;

heat-drying said bearing in said hermetic container; and introducing a rust preventive oil into said hermetic container so as to adhere part of the rust preventive oil to each of the bearings.

25. A drying apparatus comprising:

a hermetic container for hermetically sealing and holding, in its internal space, each of the bearings after being rinsed with one of an aqueous solvent and a hydrocarbon type solvent, said space being formed by combining a plurality of divided metal molds;

pressure reducing means for reducing the pressure in the internal space of said hermetic container;

heating means for heating said bearing in said internal space; and oil introducing means for introducing a rust preventive oil into the internal space of said hermetic container so as to stick part of the rust preventive oil to each of the bearings.

26. A drying apparatus comprising:

a hermetic container for hermetically sealing and holding, in its internal space, each of the bearings after being rinsed with one of an aqueous solvent and a hydrocarbon type solvent, said space being formed by combining a plurality of divided metal molds;

pressure reducing means for reducing the pressure in the internal space of said hermetic container;

heating means for heating said bearing in said internal space; and oil introducing means, comprising an oil mist lubricator, for introducing a rust preventive oil into the internal space of said hermetic container so as to stick part of the rust preventive oil to each of the bearings.

* * * * *